United States Patent [19]

Matsushita

[11] 3,778,978
[45] Dec. 18, 1973

[54] DUST COLLECTOR
[75] Inventor: Masao Matsushita, Kuritagun, Japan
[73] Assignee: Matsushita Dendokogu Co., Ltd., Osaka City, Japan
[22] Filed: Nov. 30, 1971
[21] Appl. No.: 203,137

[30] Foreign Application Priority Data
Aug. 10, 1971 Japan.................. 46/71444

[52] U.S. Cl.............. 55/223, 55/247, 55/249, 55/256, 261/120
[51] Int. Cl............................... B01d 47/02
[58] Field of Search.............. 55/244, 247, 255–256; 261/120; 210/242

[56] References Cited
UNITED STATES PATENTS
| | | | |
|---|---|---|---|
| 355,594 | 1/1887 | Daimler | 55/256 X |
| 2,405,494 | 8/1946 | Dupuy | 55/255 X |
| 66,937 | 7/1867 | Bierce | 261/120 X |

FOREIGN PATENTS OR APPLICATIONS
| | | | |
|---|---|---|---|
| 974,558 | 2/1951 | France | 55/247 |
| 66,587 | 1/1943 | Norway | 55/256 |
| 61,878 | 2/1944 | Denmark | 55/255 |
| 393,390 | 11/1921 | Germany | 55/255 |
| 843,294 | 6/1939 | France | 55/247 |

*Primary Examiner*—Frank W. Lutter
*Assistant Examiner*—Vincent Gifford
*Attorney*—Holman & Stern

[57] ABSTRACT

A dust collector comprising a closed water tank and a floating member for receiving dusty air and blowing it into the water contained in a confined bowl-like depression formed in a base plate of the floating member so as to splash the water upward to a tray placed above said bowl. By rebounding repeatedly between the tray and bowl, water screens are formed around dusty air and catch dusts which settle down at the bottom of the water tank.

1 Claim, 2 Drawing Figures

DUST COLLECTOR

BACKGROUND OF THE INVENTION

In one of the known type dust collectors, dusty air is forced to pass through a zigzag path filled with water and in another, dusty air is forced to flow through water screens. Though the former has a comparatively good dust collecting ability, much energy is dissipated to over-come the high resistance while the latter necessitates two power sources, one for forcing the dusty air to flow through water screens and the other for projecting and pulverizing water to form water screens, yet has a poor dust collecting ability.

SUMMARY OF THE INVENTION

The present invention has for its object to do away with the above mentioned defects. The dust collector according to this invention consists of a water tank and a floating member for receiving dusty air forced into the apparatus by a fan and blowing the dusty air into the water contained in a confined bowl-like portion formed at the center of a base plate and communicating with the water of the water tank. Above the bowl, an inverted tray is arranged in a space relation. The water within the bowl splashes upward against said tray by the action of the blown in dusty air and repeatedly rebounds in the space between the base plate and tray whereby screens of fine water particles will be formed around the dusty air. Thus, intimate contact between dusty air and water will be effected and will enhance the dust catching action of water.

Finally, water flows down from the periphery of the base plate and the dusts caught by water settle down at the bottom of the water tank.

As the floating member can move up or down in accordance with the water level of the tank, no water replenishment is necessary.

As is clear from the above, in the dust collector according to this invention, as dusty air acts to splash water to form screens, only one power source is necessary so the energy consumption is small. Further, its structure is simple and robust having no damageable part, the maintenance cost will be almost non-existent.

BRIEF DESCRIPTION OF THE DRAWINGS

For a fuller understanding of the invention, reference is made to the following description taken in connection with the accompanying drawing, in which.

Figure 1:
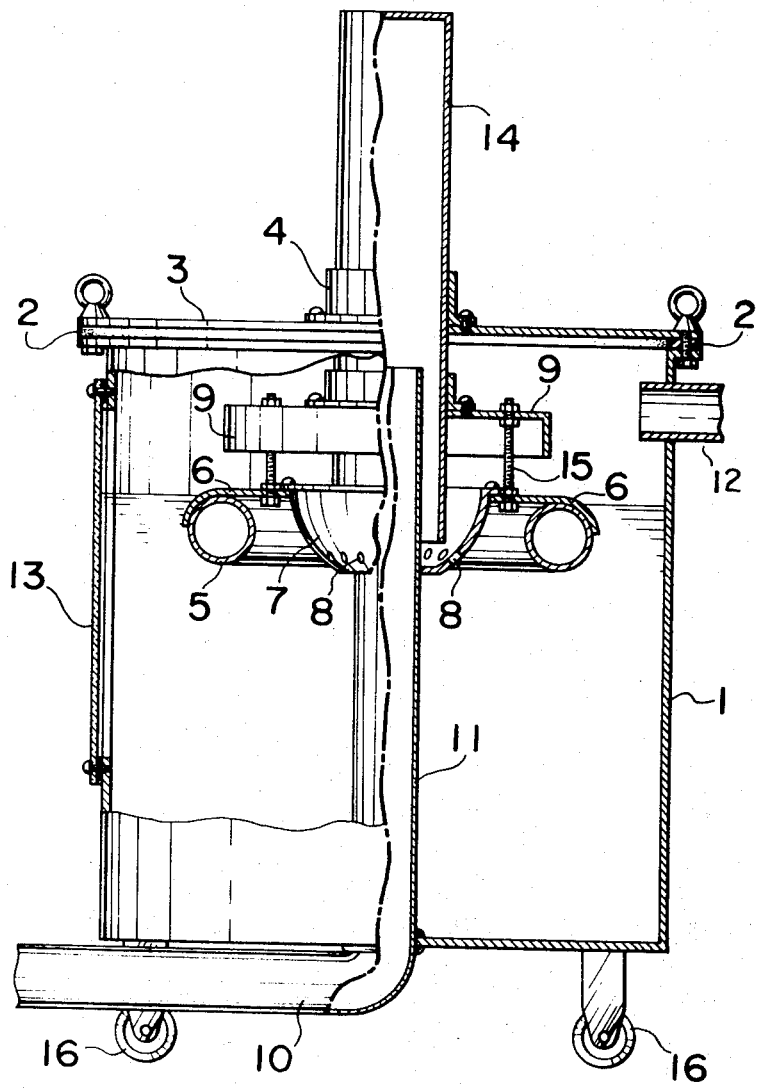
FIG. 1 is a sectional view of the dust collector according to this invention.

DETAILED DESCRIPTION OF THE PREFERRED EMBODIMENT 1 is a water tank closed by a lid 3 and packing 2. At the center of the lid, a cylinder 4 is fixed and in said cylinder, a dust air receiving cylinder 14 is slidably inserted. The cylinder 14 is closed at the top and its lower portion protrudes into the tank 1. Within the tank 1, the cylinder 14 is provided with an inverted tray 9. The lower end of the cylinder 14 opens in front of a bowl 7 which is provided at the center of a base plate 6. The diameter of the base plate is larger than that of the tray 9 and the space between them is adjustable by means of spacers such as bolts and nuts 15.

The bottom of the bowl 7 is provided with a number of small holes 8 arranged circularly. 10 is a dusty air inlet pipe with its upright portion 11 protruding in the cylinder 14 through the bowl 7.

The assemblage of the cylinder 14, tray 9 and base plate 6 is mounted on an annular float 5, the buoyancy of the latter being sufficient enough to keep the base plate 6 substantially at the same level as water in the tank 1.

12 is a purified air outlet pipe.

The apparatus may preferably be made portable by means of wheels 16. Further, the apparatus is provided with a transparent window 13 at its side wall to indicate the water level in the tank 1.

Figure 2:
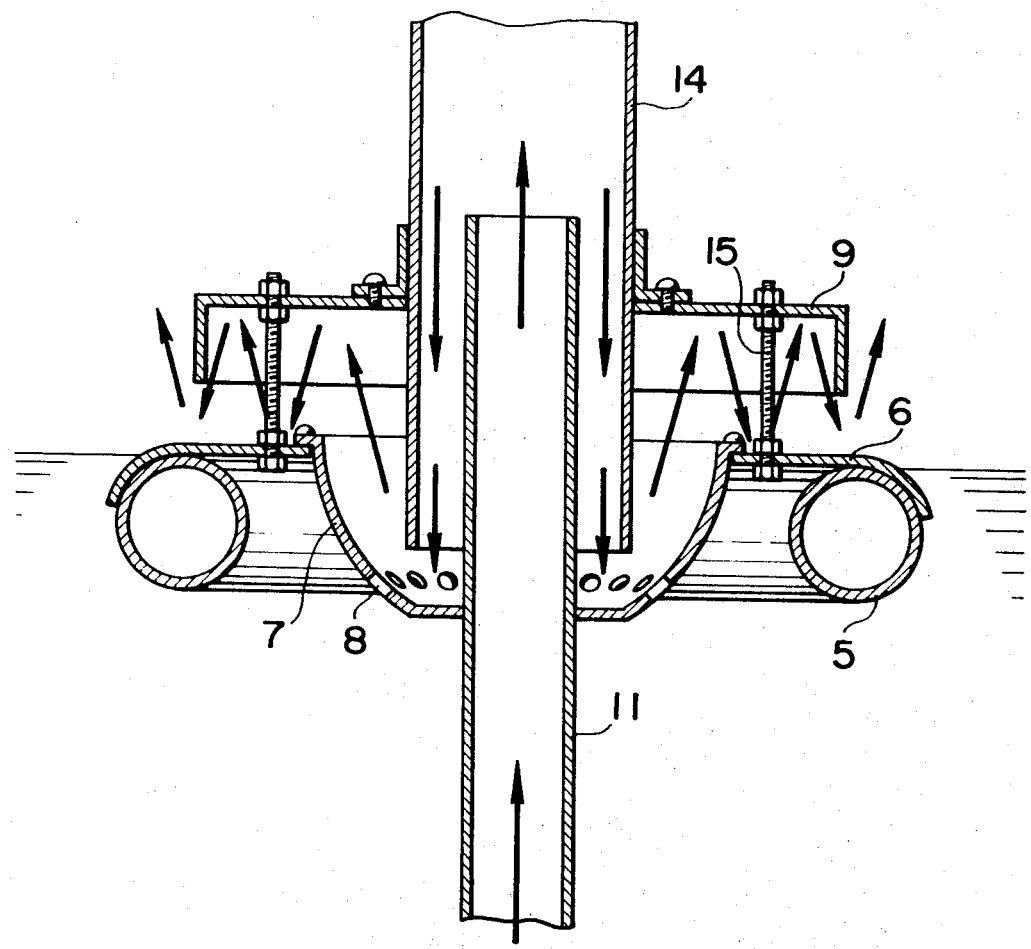
FIG. 2 is an enlarged sectional view showing the function of the invented dust collector.

The function of the above mentioned apparatus is as follows:

A suction fan is attached to the outlet pipe 12 in order to reduce the air pressure within the water tank 1. By virtue of vacuum produced in the tank 1, dusty air from a grinder, for example, is sucked in the cylinder 14 through the upright portion 11 of the inlet pipe 10 and then is blown into the water contained in the bowl 7 whereby the water within the bowl splatters upward to the tray 9 and by repeatedly rebounding between the tray 9 and the base plate 6 (see FIG. 2), screens of fine water particles will be formed around the lower portion of the cylinder 14 while water is continuously supplied into the bowl 7 through the holes 8. Thus, intimate contact between dusty air and water will be effected until water flows down from the periphery of the base plate 6 into the tank. The dust caught by water settles down at the bottom of the tank while purified air is drawn out through the outlet pipe 12.

Since the floating member or the assemblage consisting of cylinder 14, tray 9 and base plate 6 floats on the water by means of float 5, it can move freely up or down in accordance with the variations of the water level of the tank 1. The air from a hood covering a grinder usually contains hot metal particles which act to evaporate water so as to lower the water level, but in the present apparatus, it is not necessary to replenish water, because, as mentioned above, the assemblage moves down automatically to compensate the drop of the water level.

It will be obvious that a fan may be attached to the inlet pipe 10 instead of the outlet pipe 12.

It is to be understood that modifications may be effected in the structure herein disclosed without departing from the spirit of the invention or the scope of the claim.

I claim:

1. A dust collecting device comprising:
   a closed tank which is closed at its top by a lid, said tank containing water and having an outlet pipe means in its side above the water level for establishing a vacuum in said tank and withdrawing purified air therefrom;
   cylinder means for receiving dusty air having an open lower end and an upper closed end and slidably inserted in said lid so that its open end is in substantial intercommunicating relationship with the water level in said closed tank;
   tray means attached to the lower portion of said cylinder means inside said closed tank and inverted so that its trayed face faces said water level;
   base plate means adjustably attached to said tray means, said base plate means having an upper and lower surface and provided with a bowl at its center, said bowl having an upper open portion and holes disposed in the sides thereof, said bowl being in communication with said water through said holes, said base plate means being arranged in spaced relationship with said tray means so that said trayed face faces both the opening of said bowl and the upper surface of said base plate means, and the open end of the lower portion of said cylinder means is disposed in said bowl;

and wherein said trayed face of said tray means has an area smaller than the area defined by said upper surface of said base plate means;

annular float means having said base plate means mounted thereon, said annular float causing said base plate means with said bowl to float substantially at the water level in said closed tank so that said open end of said cylinder means retains its disposition with respect to the water level during movements of said water level;

inlet pipe means for feeding dusty air to said cylinder means and having an inlet end portion which is inserted through the base of said bowl and disposed within said cylinder means so as to define an annular space between the outer surface of said inlet pipe means and the inner surface of said cylinder means, whereby dusty air received in said cylinder means during operation of said dust collector flows through said annular space into said bowl and causes water particles to rebound between said tray means and said base plate means and thereby generates a dust collecting action in said dust collecting device.

* * * * *